US007389283B2

(12) United States Patent  (10) Patent No.: US 7,389,283 B2
Adler  (45) Date of Patent: Jun. 17, 2008

(54) METHOD FOR DETERMINING AN OPTIMAL GRID INDEX SPECIFICATION FOR MULTIDIMENSIONAL DATA

(75) Inventor: David William Adler, Mount Tremper, NY (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 11/007,132

(22) Filed: Dec. 7, 2004

(65) Prior Publication Data

US 2006/0129529 A1 Jun. 15, 2006

(51) Int. Cl.
*G06F 7/00* (2006.01)
(52) U.S. Cl. .................. 707/2; 707/3; 707/4; 701/200
(58) Field of Classification Search .......... 707/1, 707/6, 100, 104
See application file for complete search history.

(56) References Cited

U.S. PATENT DOCUMENTS

| | | | |
|---|---|---|---|
| 5,745,899 A | 4/1998 | Burrows | |
| 5,781,899 A | 7/1998 | Hirata | |
| 5,832,475 A | 11/1998 | Agrawal et al. | |
| 5,845,277 A | 12/1998 | Pfeil et al. | |
| 5,895,467 A | 4/1999 | Ubell et al. | |
| 5,963,956 A * | 10/1999 | Smartt | 707/104.1 |
| 6,014,614 A | 1/2000 | Herring et al. | |
| 6,021,409 A | 2/2000 | Burrows | |
| 6,038,258 A | 3/2000 | Chun et al. | |
| 6,101,492 A | 8/2000 | Jacquemin et al. | |
| 6,122,628 A | 9/2000 | Castelli et al. | |
| 6,134,541 A | 10/2000 | Castelli et al. | 707/2 |
| 6,154,748 A | 11/2000 | Gupta et al. | |
| 6,195,659 B1 | 2/2001 | Hyatt | |
| 6,201,884 B1 | 3/2001 | Van Bemmel et al. | |
| 6,219,662 B1 | 4/2001 | Fuh et al. | 707/3 |
| 6,223,182 B1 | 4/2001 | Agarwal et al. | |
| 6,233,571 B1 | 5/2001 | Egger et al. | 707/2 |
| 6,253,196 B1 | 6/2001 | Fuh et al. | |
| 6,266,663 B1 | 7/2001 | Fuh et al. | |
| 6,308,177 B1 | 10/2001 | Israni et al. | |
| 6,338,056 B1 | 1/2002 | Dessloch et al. | |
| 6,353,832 B1 | 3/2002 | Acharya et al. | 707/104 |
| 6,439,783 B1 | 8/2002 | Antoshenkov | |
| 6,460,026 B1 | 10/2002 | Pasumansky | |
| 6,484,179 B1 | 11/2002 | Roccaforte | |

(Continued)

OTHER PUBLICATIONS

Hutflesz et al., Twin Grid Files: Space Optimizing Access Schemes, Jun. 1988, ACM, vol. 17, Issue 3, pp. 183-190.*

(Continued)

*Primary Examiner*—Khanh B. Pham
*Assistant Examiner*—Jessica N Le
(74) *Attorney, Agent, or Firm*—Konrad Raynes & Victor, LLP; Janaki K. Davda

(57) ABSTRACT

A system, method, and associated computer product improve the search of multidimensional databases. The present system determines a near-optimal grid index that is used to locate a geometric shape in a spatial database. More particularly, the present system improves the technique of sampling data for defining the grid cell size in a grid for a given data set, minimizing the number times the data set needs to be sampled, thereby reducing the time to compute the cost of alternative grid index parameters.

4 Claims, 16 Drawing Sheets

U.S. PATENT DOCUMENTS

| | | | |
|---|---|---|---|
| 6,505,205 | B1 | 1/2003 | Kothuri et al. |
| 6,510,435 | B2 | 1/2003 | Bayer |
| 6,611,609 | B1 | 8/2003 | Zhu |
| 6,636,849 | B1* | 10/2003 | Tang et al. .................... 707/6 |
| 6,636,870 | B2 | 10/2003 | Roccaforte |
| 6,687,701 | B2 | 2/2004 | Karamanolis et al. |
| 6,700,574 | B1 | 3/2004 | Song .......................... 345/423 |
| 6,711,563 | B1 | 3/2004 | Koskas |
| 6,732,120 | B1 | 5/2004 | Du |
| 6,778,996 | B2* | 8/2004 | Roccaforte ............... 707/104.1 |
| 6,831,668 | B2 | 12/2004 | Cras et al. |
| 6,915,289 | B1 | 7/2005 | Malloy et al. |
| 6,922,700 | B1 | 7/2005 | Aggarwal et al. |
| 6,959,304 | B1 | 10/2005 | Teig et al. |
| 7,016,911 | B2 | 3/2006 | Bousfield et al. |
| 7,197,500 | B1 | 3/2007 | Israni et al. |
| 2002/0035432 | A1 | 3/2002 | Kubica et al. |
| 2002/0095421 | A1 | 7/2002 | Koskas |
| 2002/0129032 | A1 | 9/2002 | Bakalash et al. |
| 2002/0156779 | A1 | 10/2002 | Elliott et al. .................... 707/6 |
| 2002/0184187 | A1 | 12/2002 | Bakalash et al. |
| 2002/0188581 | A1 | 12/2002 | Fortin et al. |
| 2003/0126143 | A1 | 7/2003 | Roussopoulos et al. |
| 2003/0187867 | A1 | 10/2003 | Smartt |
| 2003/0212650 | A1 | 11/2003 | Adler et al. .................... 707/1 |
| 2003/0212677 | A1* | 11/2003 | Chen et al. .................... 707/6 |
| 2003/0212689 | A1 | 11/2003 | Chen et al. .................. 707/100 |
| 2004/0019581 | A1 | 1/2004 | Davis, II et al. |
| 2004/0036688 | A1 | 2/2004 | Cutlip |
| 2004/0117358 | A1 | 6/2004 | von Kaenel et al. |
| 2004/0225665 | A1 | 11/2004 | Toyama et al. |
| 2005/0137994 | A1 | 6/2005 | Fortin et al. |

OTHER PUBLICATIONS

U.S. Appl. No. 10/792,446, filed Mar. 2, 2004, Adler.

Aboulnaga, A., and J.F. Naughton, "Accurate Estimation of the Cost of Spatial Selections", Proceedings of the IEEE International Conference on Data Engineering, 2000, pp. 123-134.

Acharya S., V. Poosala, and S. Ramaswamy, "Selectivity Estimation in Spatial Databases", Proceedings of the 1999 ACM SIGMOD International Conference on Management of Data, Jun. 1999, pp. 13-24.

Aref, W.G., and H. Samet, "Efficient Window Block Retrieval in Quadtree-Based Spatial Databases", GeoInformatica, vol. 1, Iss. 1, Apr. 1997, pp. 59-91.

Barrodale Computing Services, Ltd. (BCS), "Storing and Manipulating Gridded Data in Databases", 2002, 13 pp.

Davis, J.R., "IBM'S DB2 Spatial Extender: Managing Geo-Spatial Information Within the DBMS", May 1998, 26 pp.

Gaede, V., and O. Gunther, "Multidimensional Access Methods", ACM Computing Surveys (CSUR), vol. 30, Iss. 2, Jun. 1998, pp. 170-231.

Gunther, O., "Der Zellbaum: Ein Index für geometrische Datenbanken [The Cell Tree: An Index for Geometric Databases]", nformatik—Forschung und Entwicklung, vol. 4, 1989, 13 pp.

Harley, M., "ArcSDE Tuning- Tips and Tradeoffs", [online], [retrieved on Jul. 23, 2003], retrieved from the Internet at <URL: http://gis2.esri.com/library/userconf/proc01/professional/papers/pap869/p869.htm>, 17 pp.

IBM Corporation, "IBM DB2 Spatial Extender- User's Guide and Reference", Version 7, Second Edition, Jun. 2001, 373 pp.

Mokbel, M.F. and W.G. Aref, "Irregularity in Multi-Dimensional Space-Filling Curves with Applications in Multimedia Databases", Proceedings of the Tenth International Conference on Information and Knowledge Management, Nov. 2001, pp. 512-519.

Nievergelt, J., H. Hinterberger, and K.C. Sevcik, "The Grid File: An Adaptable, Symmetric Multikey File Structure", ACM Transactions on Database Systems, vol. 9, No. 1, Mar. 1984, pp. 38-71.

Pagel, B., H. Six, H. Toben, and P. Widmayer, "Towards an Analysis of Range Query Performance In Spatial Data Structures", Proceedings of the Twelfth ACM SIGACT-SIGMOD-SIGART Symposium on Principles of Database Systems, 1993, pp. 214-221.

Raad, M., "ArcSDE Performance Tips", Proceedings of the Nineteenth Annual ESRI User Conference, 1999, 58 pp.

Rigaux, P., M. Scholl, & A. Voisard, "Spatial Databases with Application to GIS", Morgan Kaufmann, 2002, pp. 209-219.

Samet, H., "Spatial Data Structures", Modern Database Systems: The Object Model, Interoperability, and Beyond, Addison Wesley/ACM Press, 1995, pp. 361-385.

Shekhar, S. and S. Chawla, "Spatial Databases- A Tour", Prentice-Hall, 2003, pp. 96-100.

Shipman, L., "Moving from a Single User Database to Multi-User ArcSDE and the Geodatabase (Session 1)", Proceedings of the Nineteenth Annual ESRI User Conference, 1999, 42 pp.

* cited by examiner

| GEOMETRIC SHAPE 412 | GEOMETRIC SHAPE ID 218 |
|---|---|
| GEOMETRIC SHAPE "A" — 345 | ROW_A — 420 |
| GEOMETRIC SHAPE "B" — 350 | ROW_B — 425 |
| GEOMETRIC SHAPE "C" — 430 | ROW_C — 435 |

INDEX DATA STRUCTURE — 415, 218

| GRID CELL ID | GEOMETRIC SHAPE ID |
|---|---|
| GRID CELL (1,3) — 445 | ROW_A — 420 |
| GRID CELL (2,3) — 450 | ROW_A — 420 |
| GRID CELL (3,3) — 455 | ROW_A — 420 |
| GRID CELL (1,4) — 460 | ROW_A — 420 |
| GRID CELL (2,4) — 465 | ROW_A — 420 |
| GRID CELL (3,4) — 470 | ROW_A — 420 |
| GRID CELL (4,2) — 475 | ROW_B — 425 |
| GRID CELL (5,2) — 480 | ROW_B — 425 |
| GRID CELL (4,3) — 485 | ROW_B — 425 |
| GRID CELL (5,3) — 490 | ROW_B — 425 |
| GRID CELL (4,4) — 495 | ROW_B — 440 |
| GRID CELL (5,4) — 498 | ROW_B — 425 |

**GEOMETRY
HISTOGRAM
230**

| BUCKET | COUNT |
|---|---|
| 0.040 | 1 |
| 0.045 | 3 |
| 0.050 | 1 |
| 0.055 | 3 |
| 0.060 | 3 |
| 0.070 | 4 |
| 0.075 | 3 |
| 0.080 | 4 |
| 0.085 | 1 |
| 0.090 | 2 |
| 0.095 | 1 |
| 0.150 | 10 |
| 0.200 | 9 |
| 0.250 | 15 |
| 0.300 | 23 |
| 0.350 | 83 |
| 0.400 | 156 |
| 0.450 | 282 |
| 0.500 | 437 |
| 0.550 | 397 |
| 0.600 | 341 |
| 0.650 | 246 |
| 0.700 | 201 |
| 0.750 | 154 |
| 0.800 | 120 |
| 0.850 | 66 |
| 0.900 | 79 |
| 0.950 | 59 |
| 1.000 | 47 |
| 1.500 | 230 |
| 2.000 | 89 |
| 2.500 | 34 |
| 3.000 | 10 |
| 3.500 | 5 |
| 4.000 | 3 |
| 5.000 | 3 |
| 5.500 | 2 |
| 6.000 | 2 |
| 6.500 | 3 |
| 7.000 | 2 |
| 8.000 | 1 |
| 15.000 | 3 |
| 25.000 | 2 |
| 30.000 | 1 |

232 BUCKETCOUNT

234 BUCKET

FIG. 7

QUERY REGION
MULTIPLIERS
905

| 0.0001 |
| 0.0002 |
| 0.0005 |
| 0.0010 |
| 0.0020 |
| 0.0050 |
| 0.0100 |
| 0.0200 |
| 0.0500 |
| 0.1000 |
| 0.2000 |
| 0.5000 |

```
For (int i=0, double m=-1.0;
          m<2.0;
          m+=0.2, i++) {
G[I] = pow(10.0, m) * AvgMBR;
          }
```

FIG. 10

SAMPLE MULTIPLIERS
1305

| m1 | m2 | m3 |
|---|---|---|
| 1.0 | 0.0 | 0.0 |
| 1.0 | 2.0 | 0.0 |
| 1.0 | 2.0 | 2.0 |
| 1.0 | 2.5 | 0.0 |
| 1.0 | 2.5 | 2.0 |
| 1.0 | 2.5 | 2.5 |
| ... | | |
| 1.0 | 7.0 | 0.0 |
| ... | | |
| 1.0 | 7.0 | 7.0 |

FIG. 13A

SAMPLE GRID SIZES
1310

| gs1 | gs2 | gs3 |
|---|---|---|
| 10 | 0 | 0 |
| 10 | 20 | 0 |
| 10 | 20 | 40 |
| 10 | 25 | 0 |
| 10 | 25 | 50 |
| 10 | 25 | 62.5 |
| ... | | |
| 10 | 70 | 0 |
| ... | | |
| 10 | 70 | 490 |

FIG. 13B

METHOD FOR DETERMINING AN OPTIMAL GRID INDEX SPECIFICATION FOR MULTIDIMENSIONAL DATA

CROSS-REFERENCE TO RELATED APPLICATIONS

This application relates to co-pending U.S. patent application Ser. No. 10/144,058, entitled "Systems, Methods, and Computer Program Products to Improve Indexing of Multi-dimensional Databases," filed on May 10, 2002, and to co-pending U.S. patent application Ser. No. 10/141,919, entitled "Reducing Index Size for Multi-Level Grid Indexes," filed on May 10, 2002, both of which are assigned to the assignee as the present application.

FIELD OF THE INVENTION

The present invention generally relates to the field of indexing computer-based multidimensional data. More specifically, the present invention relates to reducing data collection used in the determination of the grid cell size when grid-indexing techniques are applied to multidimensional data on a computer system.

BACKGROUND OF THE INVENTION

Databases are computerized information storage and retrieval systems. A relational database management system (RDBMS) is a database management system (DBMS) that uses relational techniques for storing and retrieving data. Relational databases are organized into tables that comprise rows, all rows having the same columns of data. Each column maintains information on a particular type of data for the data records that comprise the rows. The rows are formally called tuples or records. A database typically comprises many tables and each table typically comprises tuples and columns. The tables are typically stored on direct access storage devices (DASD), such as magnetic or optical disk drives for semi-permanent storage.

Tables are searched using, for example, a Structured Query Language (SQL), which specifies search operations or predicates to perform on columns of tables in the database. The search operations qualify rows in the database tables that satisfy the search conditions. Relational database management system (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

Indexes are used with database implementations to provide good application query performance. Indexes are typically constructed using the data values in one or more columns of an RDBMS table row (e.g., using information such as product number, customer name, address, etc.). This information is represented by bit strings that define numeric or character values. An RDBMS may implement a B-tree index that generates a binary tree based on the bit string values. When a query includes values of columns contained in an index, the B-tree index can be scanned quickly to find the candidate rows with these column values.

Indexing techniques are used to quickly access data. Spatial data is typically information associated with geometric shapes such as lines, points, poly-lines, polygons, and surfaces. Consequently, spatial data is typically represented by one or more coordinates comprising pairs of numeric values (x, y) corresponding to, for example, locations on the earth. Spatial data is often very large and may have two, three, or more dimensions. Queries against spatial data typically are more complex than identifying a specific row or a set of rows with values between a simple range.

The indexing techniques for traditional alphanumeric data are typically based on a linear ordering of key values in a single dimension. B-tree indexing is one of the most common techniques used but this is only suited for single dimension data, not multi-dimensional data such as spatial data. Various indexing techniques have been developed specifically for multi-dimensional data. Grid indexing is one of these indexing techniques associated with searching spatial multidimensional data.

Although this technology has proven to be useful, it would be desirable to present additional improvements. The grid cell size used in grid indexing strongly affects the efficiency of accessing spatial data by techniques that employ grid indexing. A problem has been to refine the determination of particular grid cell sizes and thereby reduce the overhead associated with searching a spatial data set via grid indexing using conventional techniques. More particularly, a problem has been to reduce the computational processing to perform the sampling that occurs during statistics collection. Such data is used to determine the proper grid cell size.

Those skilled in the art will appreciate the technique of accessing spatial data by determining overlap of a geometric shape with a grid cell matrix. A grid index contains one index entry for each grid cell that overlap a geometric shape. The storage and processing increases with the number of grid cells that overlap a geometric shape. This aspect would suggest large grid cell sizes compared to geometric shape sizes in order to approach a one-to-one relationship of index entries to geometric shapes. Typical spatial queries are based on finding geometric shapes which overlap a rectangular query region. The grid index technique will scan all index entries in the grid cells which overlap the query region. As the grid size increases, more index entries outside the query region will need to be examined and discarded. An optimal grid size must determine the appropriate trade-off between these two opposing considerations.

A geometric shape that is typically the subject of spatial data may be approximated by a rectangle. When a rectangle bounds the geometric shape with a minimum enclosure, it is referred to as a "minimum-bounding rectangle." A minimum-bounding rectangle is defined to approximate a geometric shape located in a space. Coordinates located on a grid reference the minimum-bounding rectangle and the approximated geometric shape that represent the location of the minimum-bounding rectangle. For example, the coordinates on a grid that correspond to the corners of the minimum-bounding rectangle are stored and used to reference the minimum-bounding rectangle.

An index enables fast access of a certain subset of data contained in a larger set of data. The index comprises a data structure and the techniques used to build, maintain, and search the data structure for the purpose of accessing a subset of data. For example, an index may define a data structure that is used to access a specific geometric shape included in a set of spatial data. The particular index of the present example may define a data structure that contains references to the minimum-bounding rectangles associated with various geometric shapes in a spatial data set. By accessing locator references associated with the minimum-bounding rectangles, the process of accessing particular geometric shapes in a spatial data set is simplified.

Conventional techniques have typically required significant resources to locate a geometric shape in a spatial database. The lack of an efficient process for determining an index that facilitates streamlined location of minimum-bounding rectangles and associated geometric shapes has contributed to inefficient access of information in spatial databases with grid indexing. One problem has been to minimize the amount of data that is processed in order to determine an efficient grid cell size. That is, there exists a need to reduce from the processing required to perform sampling during statistics collection.

What is therefore needed is a system, a computer program product, and an associated method to improve the determination of the grid cell size when grid-indexing techniques are applied to spatial data on a computer system for significantly reducing the processing time. The need for such a solution has heretofore remained unsatisfied.

SUMMARY OF THE INVENTION

The present invention satisfies this need, and presents a system, a computer program product, and an associated method (collectively referred to herein as "the system" or "the present system") for determining an optimal grid index specification for multidimensional data. Conventional techniques require significant resources to locate a geometric shape in a spatial database. The present system advantageously improves the technique of indexing data in a multidimensional database. Such data is used to locate a geometric shape in a spatial database by associating the geometric shape with one or more grid cells. More particularly, the present system minimizes the processing to collect geometric shape statistics. These data are used to determine an efficient grid cell size in a manner such that the grid indexing technique of the present system efficiently locates a particular minimum-bounding rectangle. The minimum-bounding rectangle is associated with one or more grid cells and facilitates the location of geometric shapes.

The present system reduces the amount of computer processing required for sampling data during statistics collection associated with determining efficient grid cell sizes. In one embodiment, the present system uses geometric shape statistics to estimate the number of index entries associated with geometric shapes in the spatial database at a first grid level. The present system estimates the number of index entries associated with two or more grid levels, thereby reducing the overall number of index entries used to determine an index performance indicator, "NeQr".

The index performance indicator, NeQr, is an estimate of the grid index performance. The number of index entries and the grid cell sizes are used to estimate the number of index entries associated with the first grid level. While accessing the number of index entries, the present system obtains the number of index entries and the grid cell sizes associated with two or more grid levels. By reducing the number of index entries that identify associations between grid cells and geometric shapes, computer processing used during indexing data in a multidimensional database is minimized. Therefore the present system provides a technique for improving searches that use indexing techniques and operate on databases that comprise complex data such as, for example, spatial data.

The techniques of the present system are especially advantageous when applied to grid-indexing techniques associated with geometric shapes that are represented by spatial data in spatial databases. However, the present system is not restricted to techniques applied to spatial databases and can be used with techniques for searching other multidimensional databases.

The present system improves conventional techniques used to determine the grid cell size and facilitate efficient indexing of a spatial database. More particularly, the present system generates a reduced number of index entries when defining the grid cell size in a grid for a given data set compared with conventional techniques. By reducing the number of index entries, the determination of a minimum value of the index performance indicator, NeQr, is improved over conventional techniques by minimizing the number of index entries evaluated during a search for a geometric shape. The minimum value of the index performance indicator, NeQr, further represents the minimum number of index entries generated for geometric shapes that overlap a query window. Once the minimum number of index entries is determined, space can be partitioned by a grid into the appropriate number of grid cells to support efficient grid indexing, where space may be represented by data.

The present system determines the index performance indicator, NeQr, by generating and processing statistics associated with the data, such as the spatial data. The present system constructs a histogram of average geometry sizes that can then be used subsequently to compute the index performance indicator, NeQr, of candidate grid index values. A minimum index performance indicator and associated grid index values can then be identified.

One embodiment for partitioning space into grid cells, for the purpose of accessing spatial multidimensional data, comprises ascribing different levels to the partitioned space. The plurality of levels may represent partitions of the space in varying levels of granularity. The present system operates on these varying levels of granularity.

BRIEF DESCRIPTION OF THE DRAWINGS

The various features of system 10 and the manner of attaining them will be described in greater detail with reference to the following description, claims, and drawings, wherein reference numerals are reused, where appropriate, to indicate a correspondence between the referenced items, and wherein:

FIG. 4 comprises FIGS. 4A and 4B and represents a block diagram illustrating an SQL table and a block diagram of an index data structure that is suitably configured for operation with the index-solver module of FIGS. 1 and 2;

FIG. 7 is an exemplary geometry histogram 230 illustrating operation of the compute geometry size histogram process of FIG. 6;

FIG. 9 is a table illustrating an exemplary set of query region multipliers used in the compute query region sizes process of FIG. 8;

FIG. 10 is a process diagram illustrating a method of operation of a compute first level grid sizes process of the method of the index-solver module of FIG. 5;

FIG. 13 is comprised of FIGS. 13A and 13B and represents a table of sample multipliers and a table of sample grid sizes as used by the method of FIG. 12, wherein FIG. 13A is a more detailed representation of block 1215 of FIG. 12, and FIG. 13B is a more detailed representation of block 1220 of FIG. 12;

DETAILED DESCRIPTION OF PREFERRED EMBODIMENTS

Figure 1:
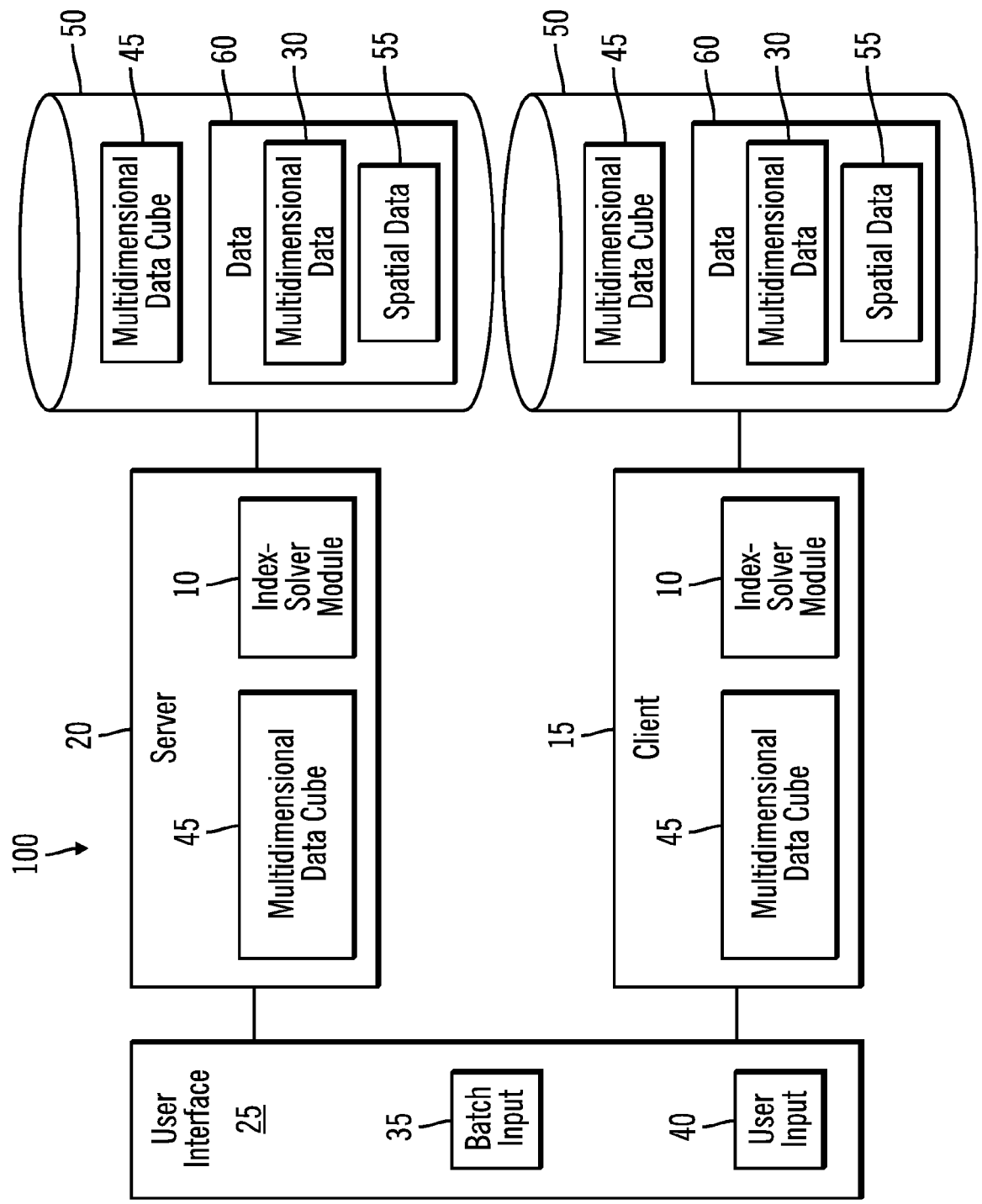
FIG. 1 is a schematic illustration of an exemplary operating environment in which an index-solver module system 10 can be used.

FIG. 1 illustrates an exemplary high-level architecture of a computer system 100 comprising a system and method for determining an optimal grid index specification for multidimensional data (the "system 10" or system 10 for index-solver module 10). System 10 includes a software programming code or computer program product that is typically embedded within, or installed on a computer. Alternatively, system 10 can be saved on a suitable storage medium such as a diskette, a CD, a hard drive, or like devices.

As shown in FIG. 1 and in the computer system 100, system 10 may operate in a client-server computer system configuration. Therefore, a client computer system (client 15) may communicate with a server computer system (server 20) during the operation of system 10. System 10 operates in either the client 15 or the server 20. For example, information may be communicated to either the server 20 or the client 15 via a user interface 25 and may subsequently be used by system 10 to determine the size of a grid that enables efficient grid-indexing searches of spatial multidimensional data 30 (also referenced herein as multidimensional data 30). One embodiment operates on the server 20 since the client 15 is typically smaller than the server 20 and may not be sufficiently robust to handle the computer resource requirements associated with practicing system 10. The user interface 25 may communicate with system 10, either via batch input 35 or user input 40.

Further, a multidimensional data cube 45 may be configured in a memory of either the client 15 or the server 20. Alternatively, the multidimensional data cube 45 may be configured in computer storage such as that of a disk 50. Spatial data 55 is a specific type of multidimensional data 30, and both spatial data 55 and multidimensional data 30 are specific types of data 60. The terms "multidimensional data cube" and "multidimensional database" are used interchangeably herein. Further, a multidimensional database 45 is a database that may store multidimensional data 30.

Figure 2:
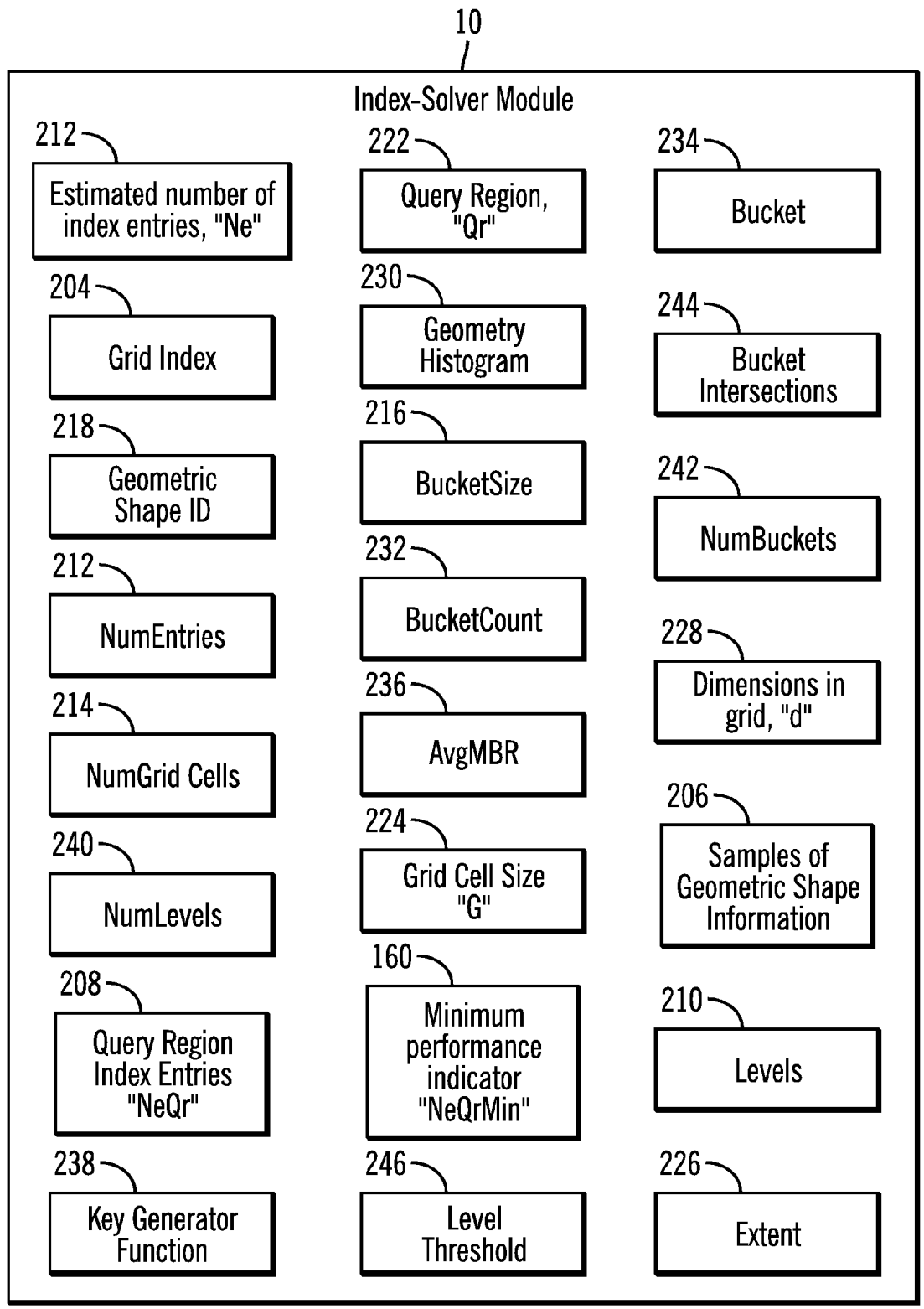
FIG. 2 is a block diagram of the high-level architecture of the index-solver module of FIG. 1.

FIG. 2 is a block diagram illustrating a high-level hierarchy of system 10. FIG. 2 is described with further reference to FIG. 3 (FIGS. 3A, 3B), an exemplary data cube as used in operation of system 10. An index performance indicator, NeQr 208, is used by system 10 to evaluate the grid index performance. By evaluating the grid index performance, system 10 provides a technique for improving searches that use grid-indexing techniques and operate on spatial data 55. A grid index 204 is used to search spatial data 55. A particular set of samples of geometric shape information 206 are found and analyzed to determine the index performance indicator, query region index entries NeQr 208. In system 10 an improved technique of minimizing the data 60 in the set of samples of geometric shape information 206 is taught. In one embodiment, the samples of geometric shape information 206 comprise 30 samples. However, system 10 may be practiced by the use of any number of samples of geometric shape information 206.

A technique for partitioning space into grids such as a grid 305 comprises ascribing different levels 210 to the partitioned space. The levels 210 may represent partitions of the space at various resolutions of grid cells such as a grid cell 310 (also referenced herein as cell 310) of grid 305. System 10 operates on a plurality of such levers 210 and estimates the number of index entries, NumEntries 212, on the first such of the levels 210 while operating at two or more such levels 210. A variable "N," represents the number of levels 210. If the number of grid cells (NumGridCells) 214 exceeds a user-defined threshold, LevelThreshold 246 (a new identifier, corresponds to the value "4" in FIG. 15, block 1520), the next of the levels 210 of information is determined.

A geometric shape identifier (ID) 218 is used during the operation of system 10 to identify a geometric shape such as geometric shape 315 so that the information associated with the geometric shape 315 may be indexed. The geometric shape ID 218 and the associated value of levels 210 are combined into the geometric shape ID 218 that is a single, unique value. This single, unique value is identified with the associated grid cell 310.

The determination of the index performance indicator NeQr 208 is completed by use of other values, such as those that follow. The query region Qr 222 is the average size of the region that is analyzed. The number of geometric shapes 315 that overlap the query region Qr 222 may be determined. The region covered by Qr 222 is smaller than the size of the extent of data that is analyzed. System 10 derives a set of candidates of query region Qr 222 based on the extent of the data that is analyzed and the index performance indicator NeQr 208 is computed for each. The grid cell size, "G," 224 is also used to determine the index performance indicator NeQr 208. The extent of the data to be analyzed, the "extent" 226, is also used during the implementation of system 10. The dimensions in grid, "d," 228 represents the dimension of the grid 305 and is used to determine NeQr 208. System 10 further comprises a geometry histogram 230, a BucketCount 232, a bucket 234, an AvgMBR 236, a minimum performance indicator NeQrMin 160, and a NumLevels 240 which will be described in further detail. FIG. 2 also illustrates key generator function 238.

Figure 3A:
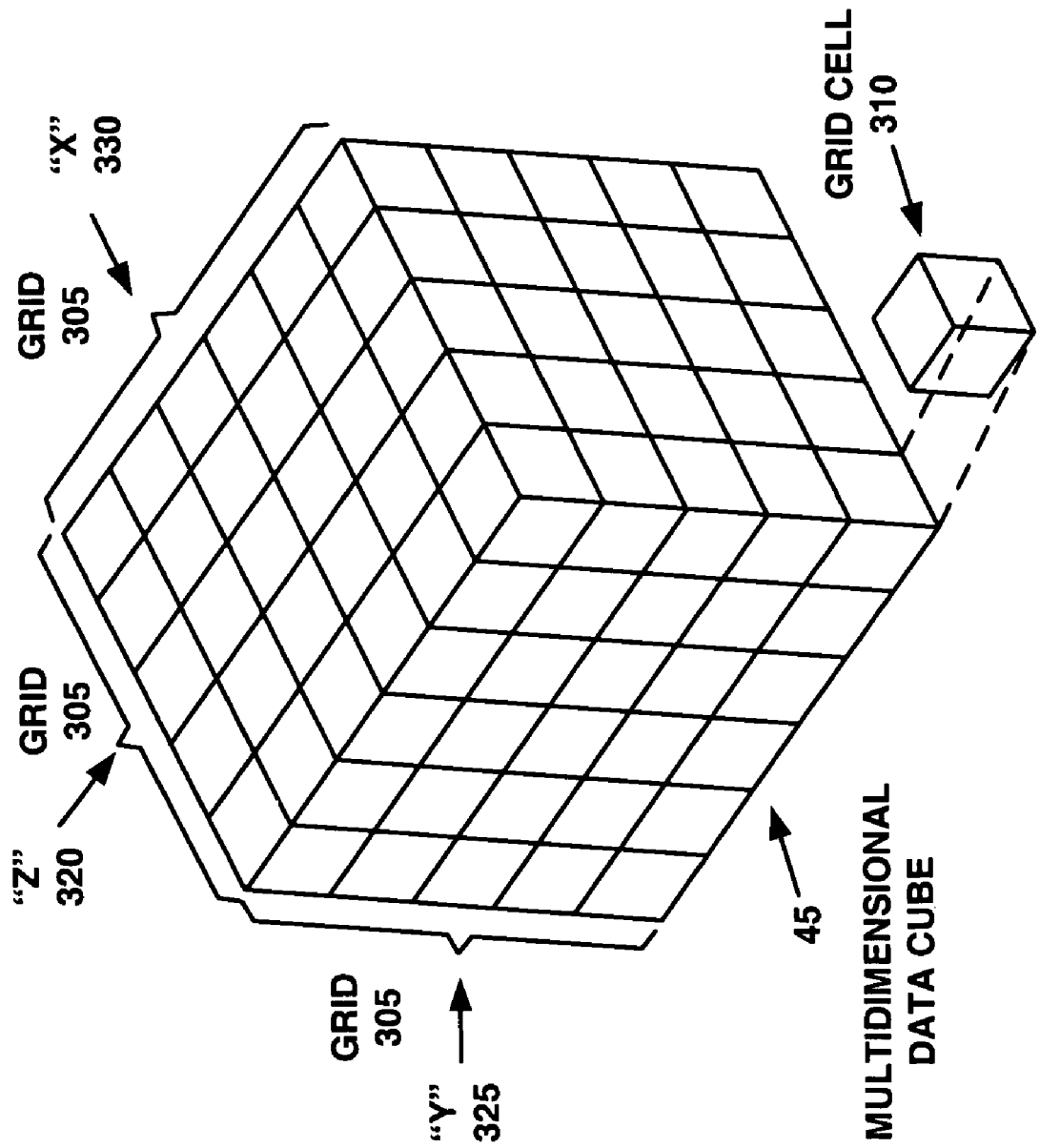
FIG. 3 comprises FIGS. 3A and 3B and represents a block diagram of a multidimensional data cube and a block diagram of a grid that is suitably configured for operation with the index-solver module of FIGS. 1 and 2.

As illustrated in FIG. 3A, a multidimensional data cube 45 is suitably configured for operation with system 10. Therefore, by means of explanation, an example of the operation of system 10 is described. As shown in FIG. 3A, system 10 determines an efficient size for the grid cells such as grid cell 310 by finding the minimum value of an index performance indicator NeQr 208. More particularly, system 10 improves the technique of defining the grid cell size G 224 in grid 305 of a given data set, data 60. Grid 305 represents the decomposition of data 60 into units that may be uniform or of varying size. The grid cell 310 is a specific instance of a unit contained within grid 305. Specific examples of grid 305 comprise the "X" dimension grid 320, the "Y" dimension grid 325, and the "Z" dimension grid 330.

Figure 3B:
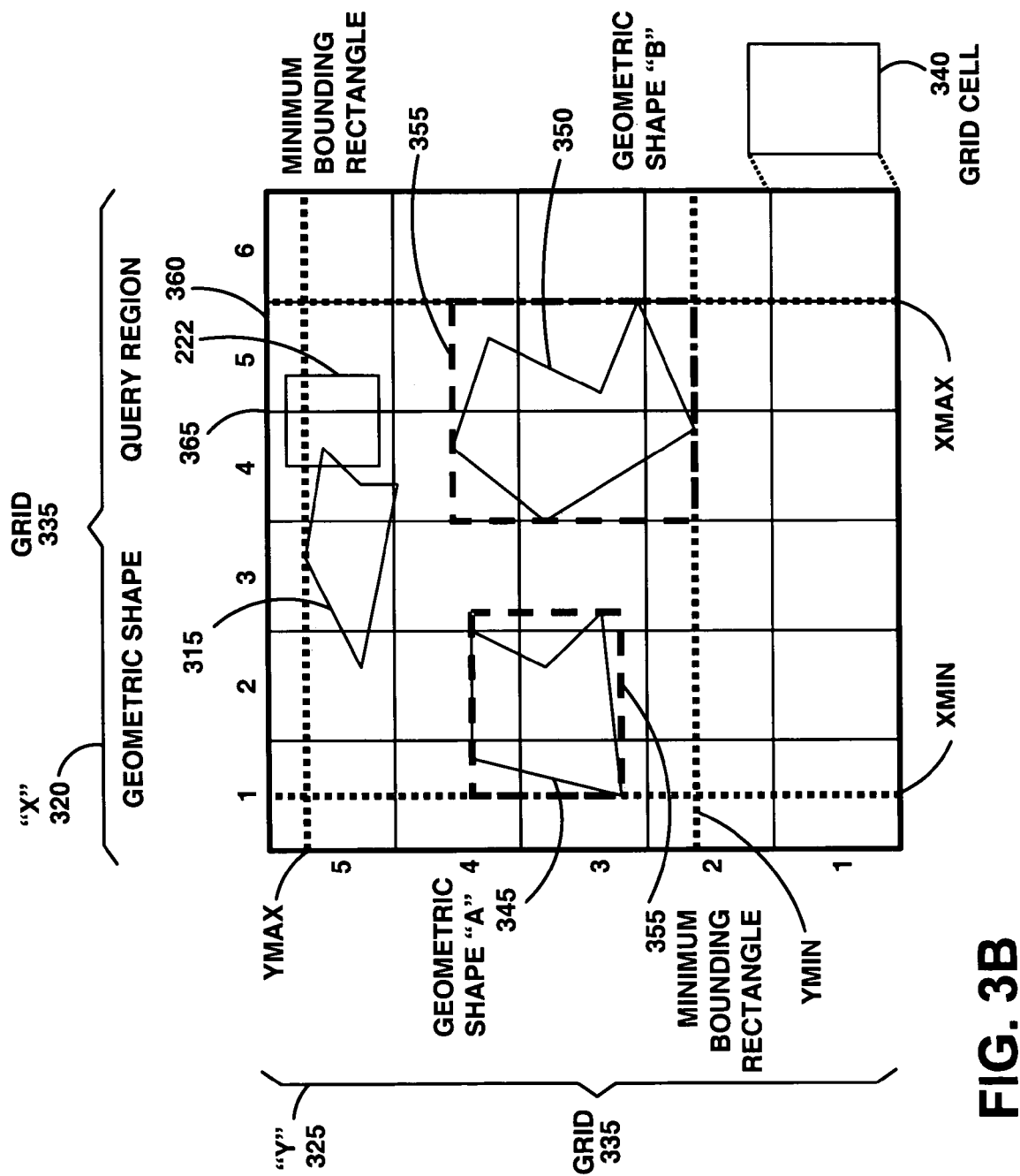

FIG. 3B illustrates a two-dimensional grid 335 (grid 335). System 10 operates on spatial data 55 that is information that represents the geometric shape 315. The two-dimensional grid 335 comprises examples of a dimension grid 320 and a Y dimension grid 325. Further in the present example, the dimension grid 320 comprises six units and the Y dimension grid 325 comprises five units. The two-dimensional grid 335 comprises grid cells such as grid cell 340 that may be referenced by the units of the dimension grid 320 and the Y dimension grid 325. The geometric shape "A" 345 and the geometric shape "B" 350 are each bounded by a minimum-bounding rectangle 355. The variable Qr 222 represents a query region and in this example Qr 222 overlaps two grid cells, grid cell 360 and grid cell 365.

FIG. 4 is a block diagram that illustrates an SQL table 405 and an index data structure 410. A spatial database system generates the index data structure 410 that comprises geometric shape ID 218 and grid cell ID 415. SQL table 405 comprises a column for geometric shape 412 and a column for geometric shape ID 218, associating geometric shape 412 with geometric shape ID 218.

For example, the geometric shape A, 345, is associated with the Row_A geometric shape ID 420. Also, the geometric shape B, 350, is associated with the Row_B geometric shape ID 425. Further, the geometric shape C, 430, is associated with the Row_C geometric shape ID 435.

The geometric shape ID 218 and the grid cell ID 415 may be jointly used as an index to locate a specific geometric shape 315. The term, "index," as used herein may be implemented as a set of pointers that are logically ordered by the values of a database key. The term "database key" as used herein is a column or an ordered collection of columns that are identified in the description of a table, index, or referential constraint. Indexes provide quick access to data 60 and can enforce uniqueness on the rows in the table. A table is a named data object comprising a specific number of columns and a set of rows. An index entry 440 is an entire row in the index data structure 410 and comprises a grid cell ID 415 and a geometric shape ID 218.

The index data structure 410 is used to associate each grid cell 340 that overlaps with the geometric shape 315 thereby enabling searches of the information associated with a geometric shape 315. For example, geometric shape A, 345, overlaps the following grid cells: grid cell (1,3) as shown in element 445, grid cell (2,3) as shown in element 450, grid cell (3,3) as shown in element 455, grid cell (1,4) as shown in element 460, grid cell (2,4) as shown in element 465, and grid cell (3,4) as shown in element 470. Element 445, element 450, element 455, element 460, element 465, and element 470 overlap with geometric shape A 345 and are therefore associated with Row_A geometric shape ID, as shown in element 420.

Similarly, geometric shape B, 350, overlaps with the following grid cells: grid cell (4,2) as shown in element 475, grid cell (5,2) as shown in element 480, grid cell (4,3) as shown in element 485, grid cell (5,3) as shown in element 490, grid cell (4,4) as shown in element 495, and grid cell (5,4) as shown in element 498. Element 475, element 480, element 485, element 490, element 495, and element 498 overlap with geometric shape B 350 and are therefore associated with Row_B geometric shape ID 425.

Figure 5:
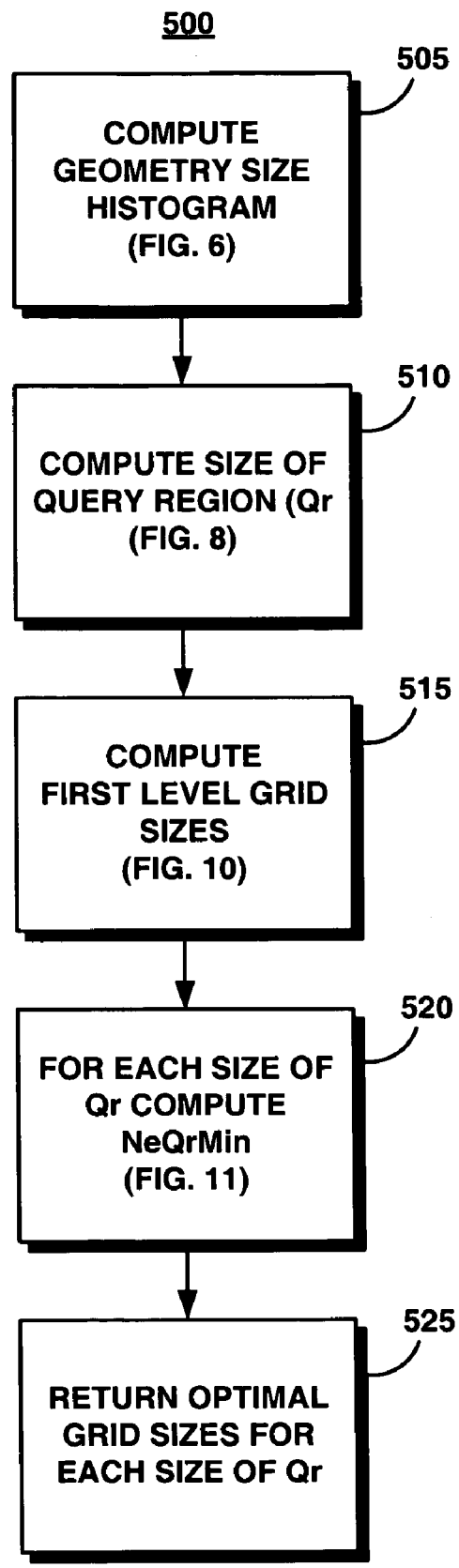
FIG. 5 is a process diagram illustrating a method of operation of the index-solver module of FIGS. 1 and 2.

FIG. 5 illustrates a method 500 of system 10 that determines more efficiently than in the past the grid-sampling information that is used to determine the value of a grid index 204 that is typically the minimum value of the index performance indicator NeQr 208, and that is used in searching data 60 in a multidimensional database 45. More particularly by using additional grid levels 210 to minimize the number of index entries such as index entry 440 to be processed, system 10 efficiently determines the index performance indicator NeQr 208 in a multidimensional database 45. The grid-indexing searches may be performed on data 60, such as spatial data 55 that may be stored on a disk 50. The method comprises: creating a histogram of geometry sizes (a geometry size histogram) (step 505, further explained in FIG. 6), computing a set of appropriate sizes for the query region Qr 222 (step 510, further explained in FIG. 8), computing a set of appropriate first level grid sizes (step 515, further explained in FIG. 10), for a size of each query region Qr 222, computing the minimum performance indicator "NeQrmin" 240 (step 520, further explained in FIG. 11), and returning the optimal grid sizes for each size of the query region Qr 222 (step 525).

Figure 6:
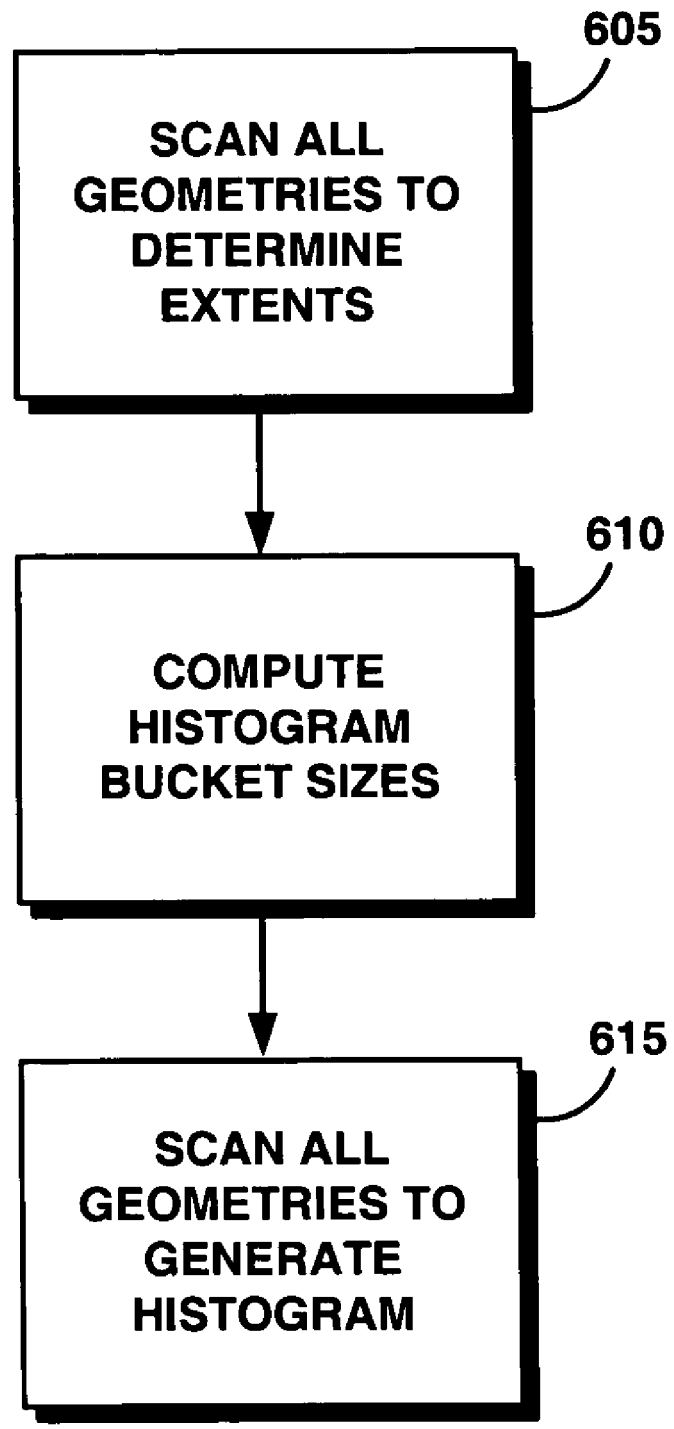
FIG. 6 is a process diagram illustrating a method of operation of a compute geometry size histogram process of the method of the index-solver module of FIG. 5.

FIG. 6 illustrates the computation of the geometry histogram 230 process of step 505 (FIG. 5). The computation of the geometry histogram 230 is based on several steps that analyze the spatial characteristics of a user-specified table. The geometries in the table are scanned to determine the minimum and maximum extents of the coordinate values and the largest and average maximum size of the bounding rectangle 355 (FIG. 3B) (step 605). An example of an SQL query that can determine these values for two-dimensional data follows:

```
SELECT
    MIN(shape..xmin) AS xmin,
    MIN(shape..ymin) AS ymin,
    MAX(shape..xmax) AS xmax,
    MAX(shape..ymax) AS ymax,
    MAX(
        CASE WHEN shape..xmax - shape..xmin > shape..ymax - shape..ymin
            THEN shape..xmax - shape..xmin
            ELSE shape..ymax - shape..ymin
        END) AS maxmbr,
    AVERAGE(
        CASE WHEN shape..xmax - shape..xmin > shape..ymax - shape..ymin
            THEN shape..xmax - shape..xmin
            ELSE shape..ymax - shape..ymin
        END) AS avgmbr
FROM schema.table
```

System 10 computes the "bucket" sizes, BucketSize 216, for the geometry histogram 230 (step 610). BucketSize 216 is computed by dividing the size of the largest maximum bounding rectangle 355 into an appropriate number of intervals. System 10 bases the BucketSize 216 on a logarithmic scale with 50 "buckets" such as bucket 234. System 10 scans geometries to generate the geometry histogram 230 (step 615) as follows:

```
scaleFactor = pow(10.0, 4 - int(log10(maxmbr)))
WITH mbrs(mbr) AS (
SELECT
    CASE WHEN shape..xmax - shape..xmin > shape..ymax - shape..ymin
        THEN shape..xmax - shape..xmin
        ELSE shape..ymax - shape..ymin
```

```
         END * :scaleFactor
     AS mbr
     FROM sde.counties ),
     buckets (bucket) as (
     SELECT
         CASE
             WHEN mbr < 10.0 then ceil(mbr / 0.5) * 0.5
             WHEN mbr < 100.0 then ceil( mbr / 5) * 5
             WHEN mbr < 1000.0 then ceil( mbr / 50 ) * 50
             WHEN mbr < 10000.0 then ceil( mbr / 500 ) * 500
             WHEN mbr < 100000.0 then ceil( mbr / 5000 ) * 5000
             ELSE 100000
         END AS bucket
         FROM mbrs
SELECT
     bucket / :scaleFactor AS bucket,
     COUNT(*) AS count
FROM groups
GROUP BY bucket
ORDER by bucket
```

FIG. 7 illustrates an example of the values or bucket sizes of BucketSize 216 of a geometry histogram 230 (FIG. 2) and counts (BucketCount 232, FIG. 2) of the geometries in each "bucket" 234. The values of FIG. 7 are used later in an exemplary computation of "NeQr" 208.

Figure 8:
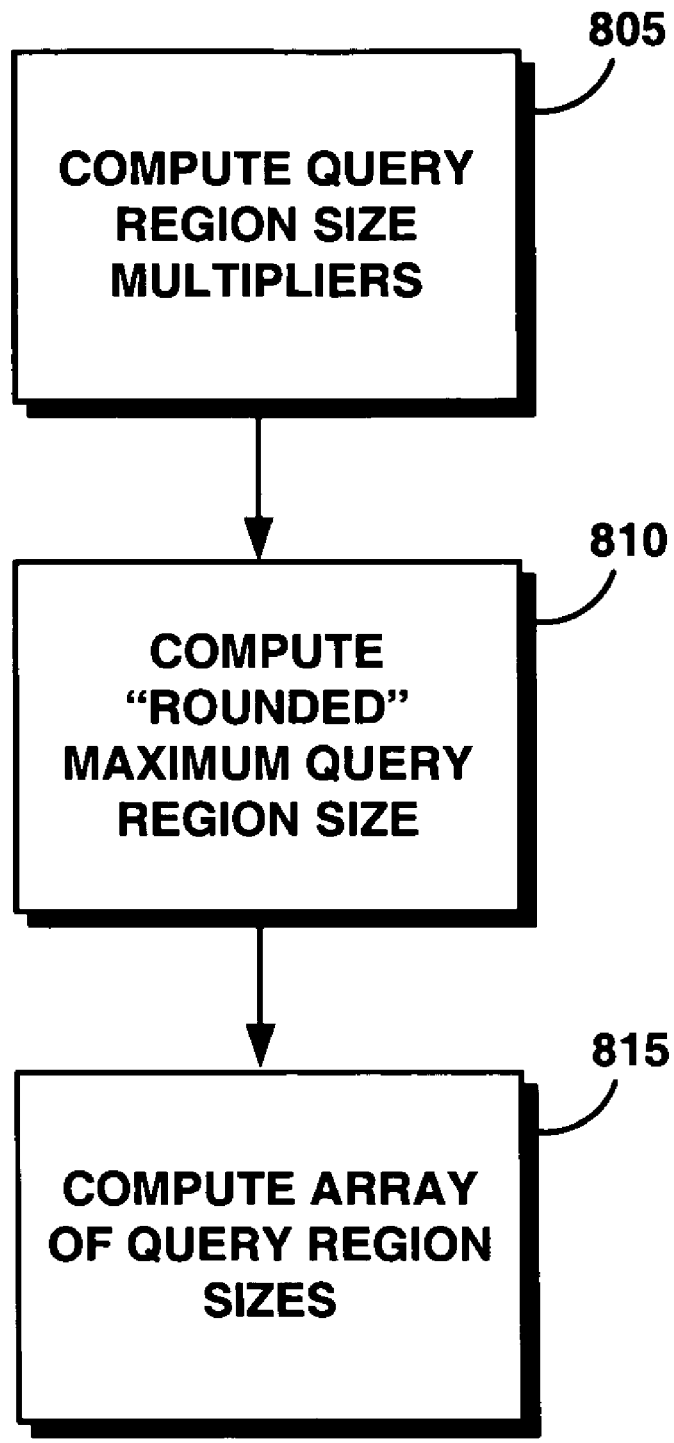
FIG. 8 is a process diagram illustrating a method of operation of a compute query region sizes process of the method of the index-solver module of FIG. 5.

FIG. 8 illustrates the computation of the query region sizes (step 510, FIG. 5). A range of end-user "friendly" region sizes are computed (step 805) by first picking a set of multipliers. In one embodiment, system 10 uses the values 1, 2, and 5 as multipliers for each decade of query region sizes. These multipliers are divided by 10, 100, 1000, 10000 to produce an exemplary set of 12 query region multipliers 905 as shown in FIG. 9. A maximum query region size is determined by taking the smaller of the data extents and rounding up to the next higher power of 10 (step 810). The smaller of the values of the extent 226 is computed as follows:

MinExtent=min(xmax−xmin, ymax−ymin)

System 10 rounds MinExtent up as follows:

Maxqr=pow(10.0, floor(log 10(MinExtent)))

System 10 computes an array of query region sizes by multiplying Maxqr by each of the query region multipliers (step 815).

FIG. 10 illustrates a computation of the first level grid sizes (step 515, FIG. 5). Empirical analysis has shown that an optimal grid size is in the range between the average MBR (AvgMBR 236) divided by 10 to the AvgMBR 236 multiplied by 100. Various methods can be used to compute values in this range. In one embodiment, system 10 uses a logarithmic distribution with five steps for each decade. In one embodiment, the logic loops through powers of 10 from −1(1/10) to +2(100) in increments of 0.2, which provides 5 steps per decade.

When a grid cell size G 224 is smaller than the average minimum boundary rectangle 355, many index entries such as index entry 440 are produced. Therefore, determining a grid cell size G 224 that is large enough to minimize the number of index entries, NeQr 208 while maintaining a useful grid cell size G 224 improves techniques of the past. The grid cell size G 224 of the first level 210 is therefore smaller than the grid cell size G 224 of subsequent levels of level 210. By estimating coarser grid cell sizes for grid cell size G 224 on subsequent levels of level 210, system 10 produces fewer index entries for large geometric shapes than a conventional system produces. Although the use of coarser grid cell sizes for grid cell size G 224 produce fewer index entries, this benefit is potentially offset by the larger number of index entries that may be contained in the grid cells that intersect the query region Qr 222. System 10 determines near-optimal values of the grid cell sizes that minimize the cost factor "NeQr" 208.

Figure 11:
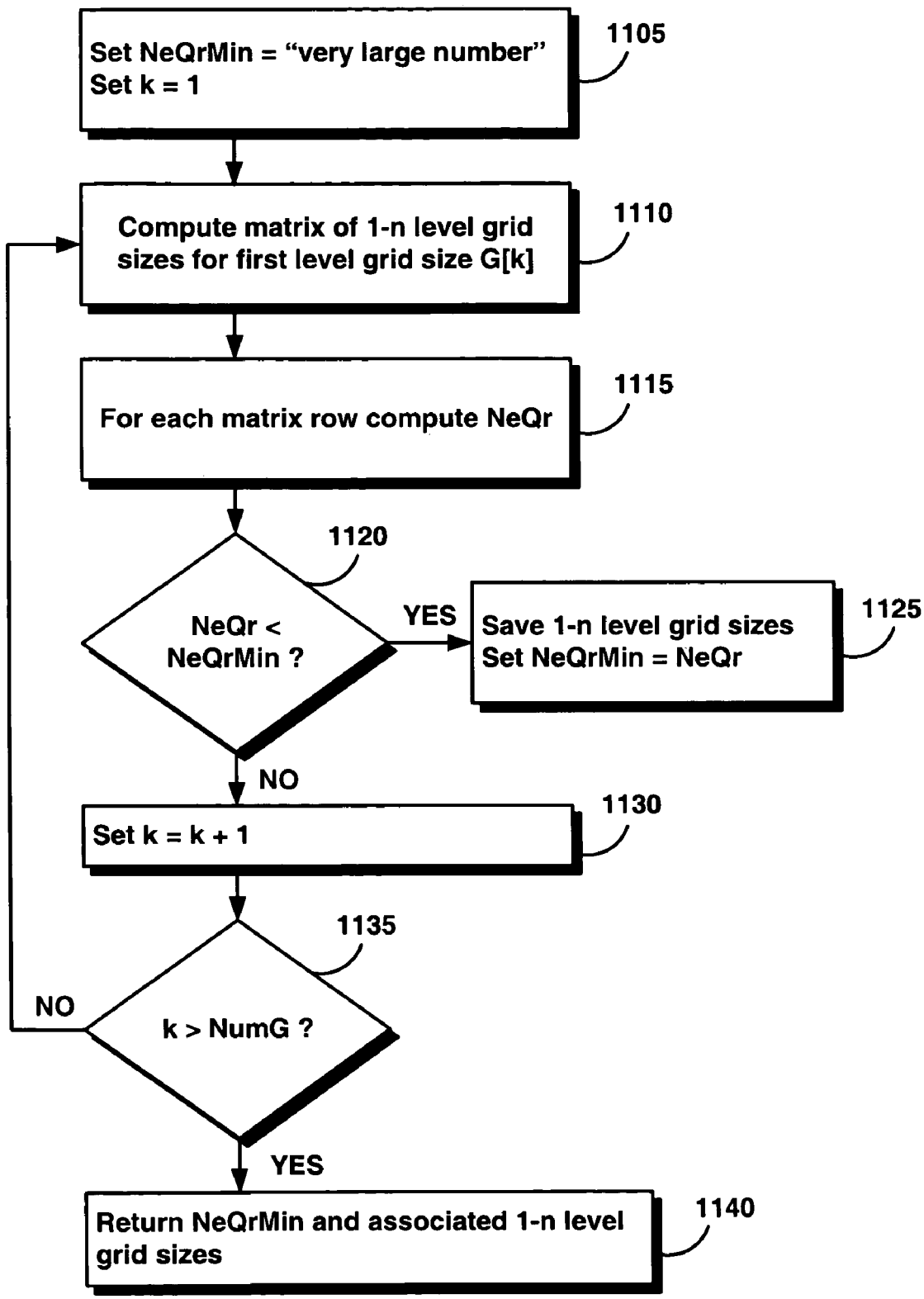
FIG. 11 is a process diagram illustrating a method of operation of a compute minimum NeQrMin for each query window size of the index-solver module of FIGS. 1 and 2.
Figure 12:
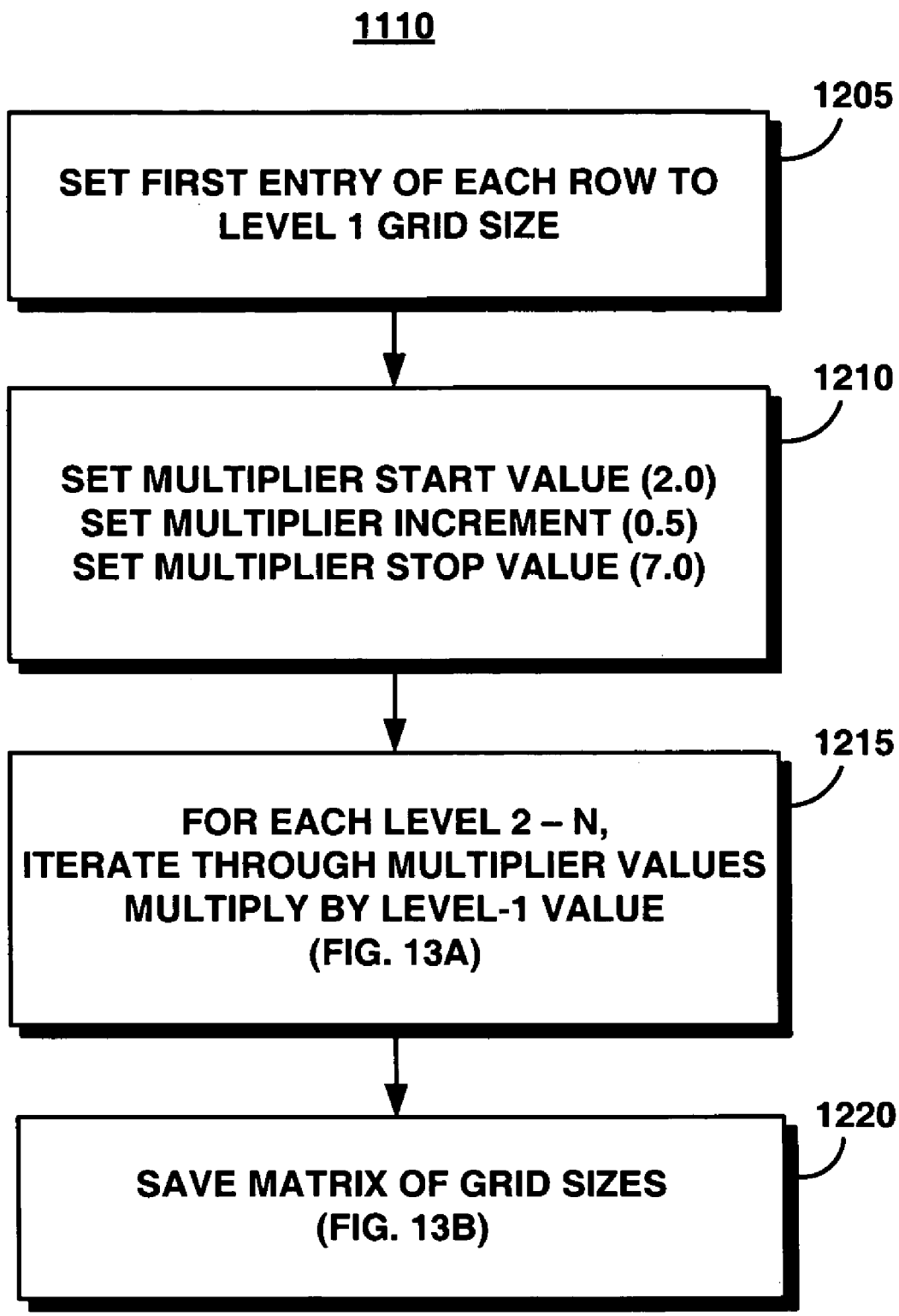
FIG. 12 is a process diagram illustrating a method of operation of a compute matrix of 1-n level grid sizes process of the method of FIG. 11.

FIG. 11 illustrates a method for step 520 (FIG. 5) in determining NeQrMin 160. Step 1105 sets NeQrMin to a "very large number" and sets k to 1. Step 1110, further described in FIG. 12 determines a matrix of candidate grid sizes. In this example, three grid levels are used but this can be extended as desired. FIG. 12 illustrates setting a first entry of each row to level 1 grid size (step 1205). Multiplier start value (2.0), multiplier increment (0.5), and multiplier stop value (7.0) are set (step 1210). For each level 2-N iterate through multiplier values and multiply by level-1 value (step 1215). The matrix of grid sizes is saved (step 1220). One embodiment of system 10 uses the values 1305 indicated in FIG. 13A as this has proven to be appropriate for a large set of sample data that has been analyzed. FIG. 13B shows an example of the matrix of sample grid sizes 1310 that would be produced for a candidate first level grid size with the value "10".

System 10 makes use of the statistical intersections of the MBR of a geometry with a particular grid cell size. In the simplest case with a one-dimensional grid of size "G" 224, if an extent of size "e" is placed on this grid, the average number of intersections "int" is given by:

$$\text{int} = 1 + (e/G) \tag{1}$$

For a space of dimension "d" 228, the extent size "e" is taken from the greatest extent of all dimensions of the MBR. The average number of intersections "i" is given by:

$$i = (1 + (e/G))^{**}d \tag{2}$$

Figure 14:
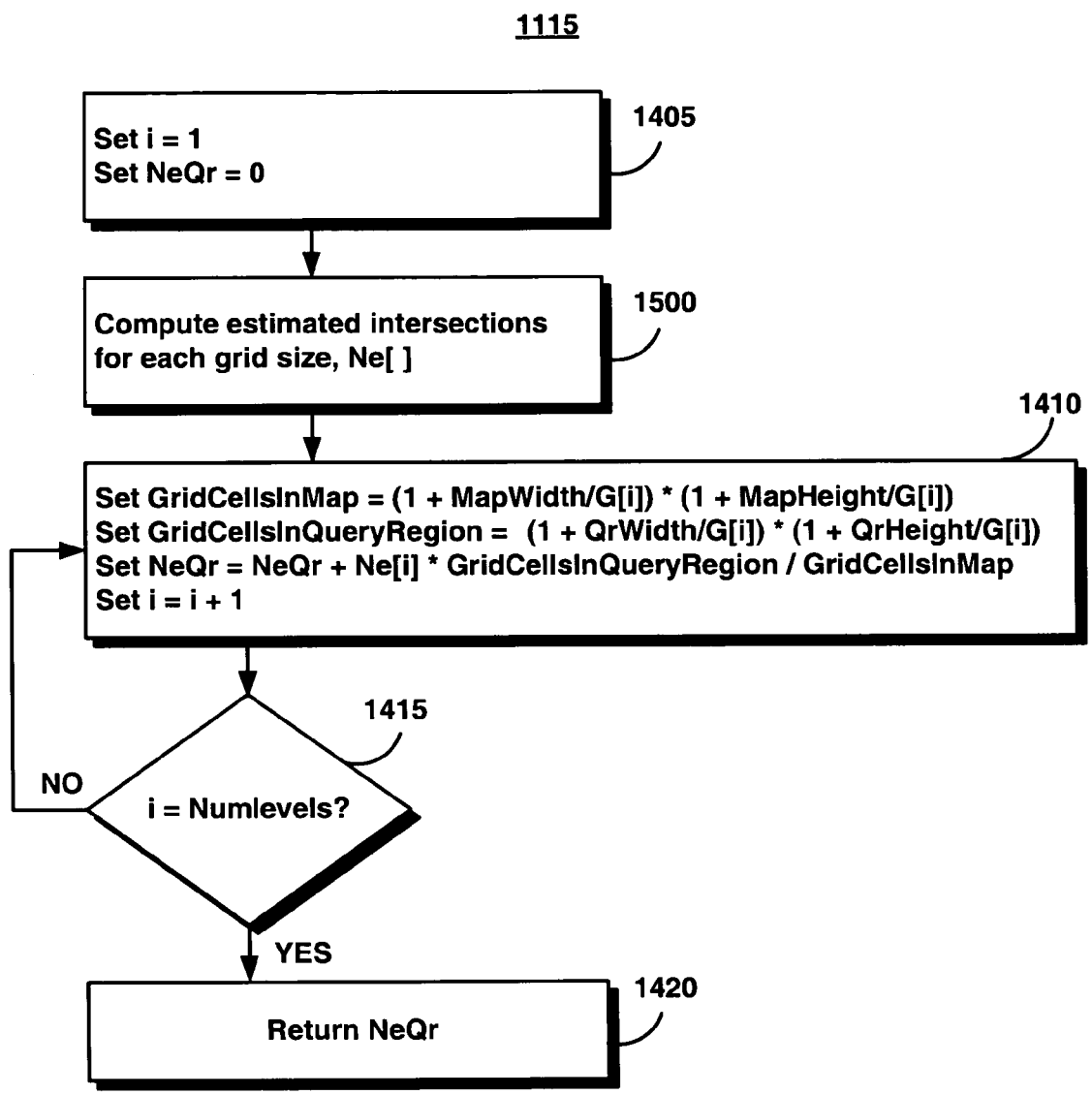
FIG. 14 is a process diagram illustrating a method of operation of a compute NeQr of the method of FIG. 11.

FIG. 14 illustrates a method for step 1115 of FIG. 11 of computing the number of index entries 208 (NeQr 208) that are covered by a query region 222 (Qr 222). The values G[I] are provided as input to the process from step 1110 of FIG. 11. In FIG. 14, I is set to 1 and NeQr is set to 0 (step 1405). The values Ne[I] are computed by invoking the process described in FIG. 15. The method of step 1500 of FIG. 15 estimates the total number of index entries 212 (Ne 212) to represent all of the geometries at the appropriate grid sizes. The method of step 1410 further multiplies Ne 212 by the fraction of the total geometry coordinate space that is covered by the query region 222 (Qr 222). The following values are computed for each defined grid cell size "G" 224:

$$\text{GridCellsInMap}[i] = (1 + (\text{MapWidth}/G[i])) * (1 + (\text{MapHeight}/G[i])) \tag{3}$$

$$\text{GridCellsInQueryRegion}[i] = (1 + (\text{QrWidth}/G[i])) * (1 + (\text{QrHeight}/G[i])) \tag{4}$$

$$\text{NeQr}[i] = \text{Ne}[i] * \text{GridCellsInQueryRegion}[i] / \text{GridCellsInMap}[i] \tag{5}$$

The total cost "NeQr" is then the sum of "NeQr[i]" over the grid sizes for all levels. In stet 1415, it is determined whether I=Numlevels. If so, processing continues to step 1420, otherwise, processing returns to step 1410. In step 1420, NeQr is returned.

Figure 15:
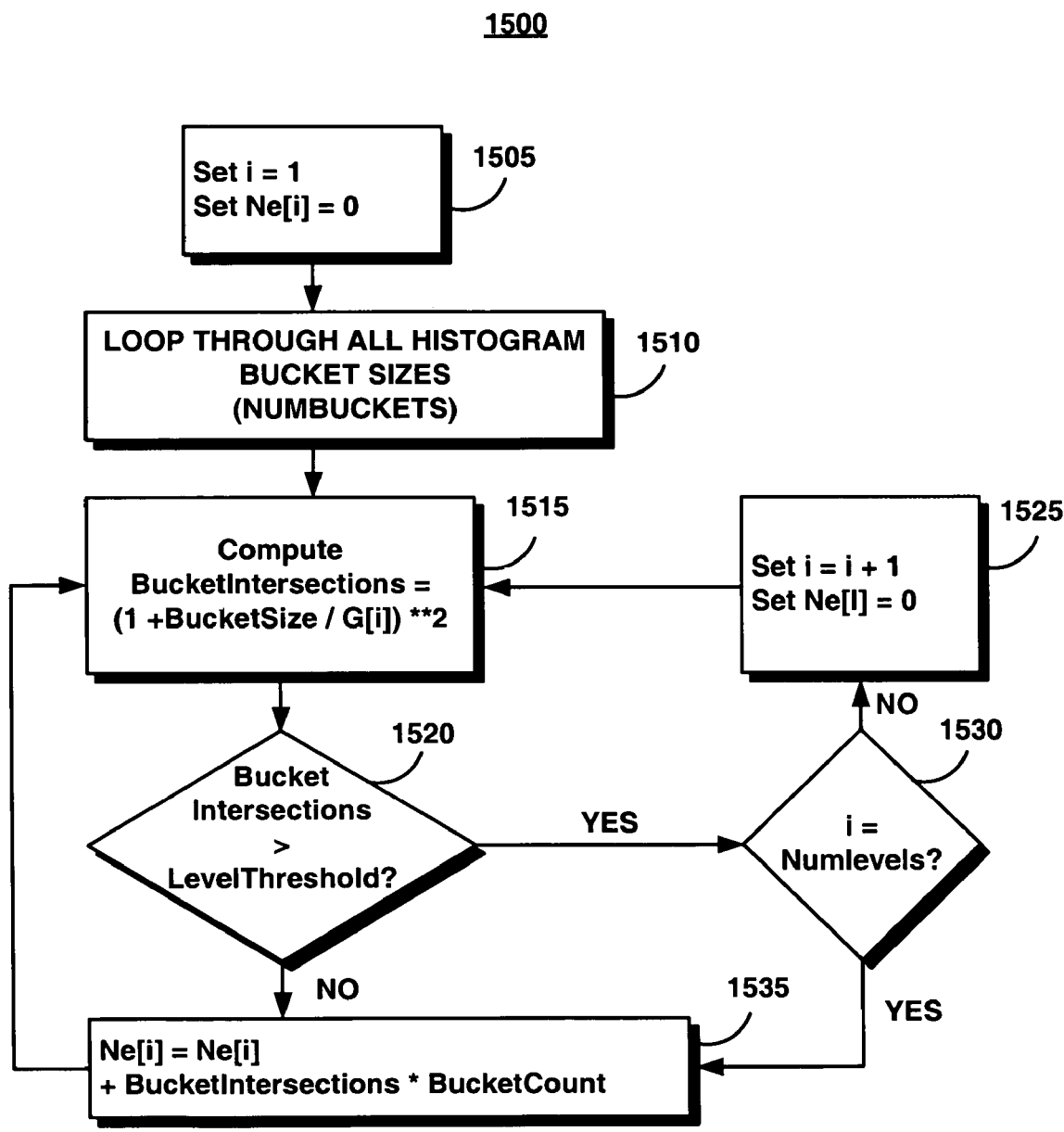
FIG. 15 is a process diagram illustrating a method of operation of a compute Ne[i] of the index-solver module of FIGS. 1 and 2.

FIGS. 14 and 15 show the process for an exemplary 2-dimensional map as a subset of the processing for an arbitrary n-dimensional space. It should be clear that the same or similar logic applies to n dimensions, where n is greater than, or equal to 3.

An index performance indicator NeQrMin 240 is minimized as shown in step 520 (FIG. 11), and improves the performance of grid-indexing searches on multidimensional data 30, such as spatial data 55. More particularly, as the value of the NeQr 208 is reduced, the number of search operations is reduced. That is, the number of index entries 440 to be searched is reduced. System 10 decreases the time required for database search operations that use a grid index 204 over the past, and improves the spatial grid index 204 over the past by determining the minimum value of NeQr 208 and the corresponding values of the grid cell size 224. In step 1120, it is determined whether NeQr<NeQrMin. If so, processing continues to step 1125, otherwise processing continues to step 1130. Therefore as shown in step 1125, system 10 minimizes the number of index entries 212 that will be processed in the index data structure 410. In step 1130, K is set to K+1. In step 1135, it is determined whether k>NumG. If so, processing continues to step 1140, otherwise, processing continues to step 1110. In step 1140, NeQrMin and associated 1–n level grid sizes are returned.

FIG. 15 shows a method 1500 of estimating the number of index entries "Ne[i]" that geometric shapes produce for all grid size levels "i". In one embodiment, system 10 uses a threshold 216 of four to determine when a new level "i" 210 is used. This process is applied to each "Bucket" 234 of the "Geometry histogram 230" shown in FIG. 7.

Method 1500 of system 10 operates with a plurality of levels, "i," such as level 210. FIG. 15 describes an implementation of system 10 that determines when another level 210 is used.

The number of levels, NumLevels 240 (FIG. 2), may be determined to ensure optimal operations with specific spatial data 55 and the invention may be practiced with any number of levels, NumLevels 240. System 10 initializes method 1500 by setting i=0 and Ne[i]=0, where i is an increment for the level number, NumLevels 240 (step 1505). System 10 loops through all sizes of histogram bucket 234 (step 1510) using NumBuckets 242. System 10 operates by determining the grid cell sizes 224 associated with a sample 206 on a per-level basis using three levels 210. In one embodiment, system 10 operates efficiently if four or less grid cells 310 overlap with a geometric shape 315; i.e., an exemplary threshold 216 of system 10 is four (LevelThreshold 246).

Statistics are computed on a per-level basis (step 1515) by computing BucketIntersections 244. Exemplary statistics are grid cell intersections, BucketIntersections 244.

BucketInterSections=(1+BucketSize/$G[l]$)**2.

System 10 determines whether more than LevelThreshold 246 grid cells 310 overlap with the current bucket size 216 (decision step 1520). If YES, system 10 improves the collection of statistics by estimating the grid cell size 224 based on the sample 206 taken at the next level 210. If the bucket size 216 overlap more than four grid cells 310, then the next level 210 with a larger grid cell size 224 is used to practice system 10 (decision step 1530). The grid cell size 224 is incremented by incrementing: "i"="i"+1 (step 1525).

Therefore, if the result of decision step 1520 is YES, then at other levels 210 a concentration of geometric shapes 310 is determined (step 1515). If there is such a concentration then the appropriate grid cell size, G, 224 may be ascertained and is associated with the concentration of geometric shapes 310. The operation of step 1515 is described in detail with reference to FIG. 3G. If the result of decision step 1520 is NO, then the current level of analysis is used for grid indexing (step 1535).

Figure 16:
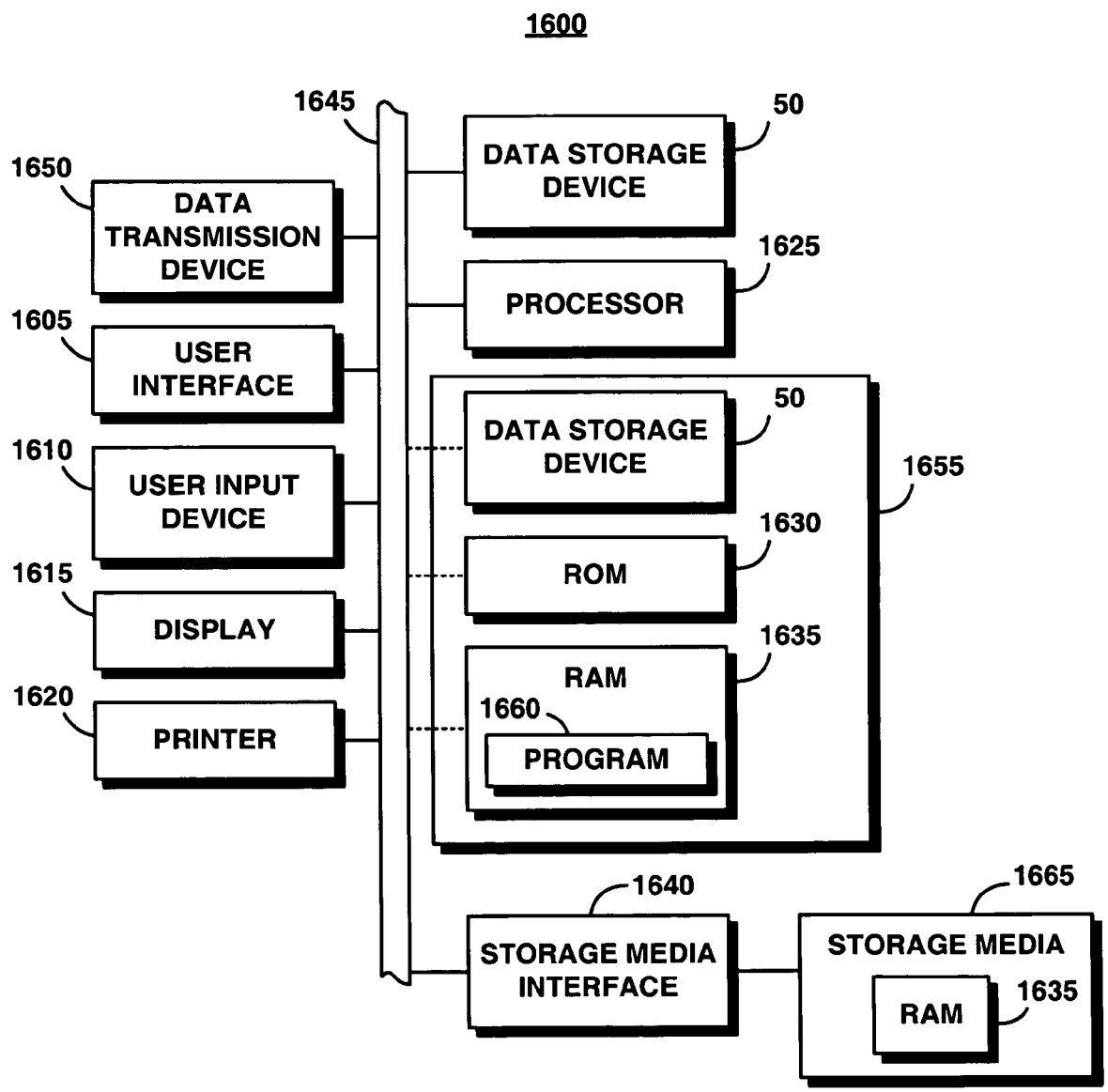
FIG. 16 is a block diagram of a computer system suitably configured for employment of the index-solver module of FIGS. 1 and 2.

FIG. 16 is a block diagram of a computer system 1600, suitable for employment of system 10. The computer system 1600 may be implemented on a general-purpose microcomputer, or other conventional workstation or graphics computer devices, wireless devices, or mainframe computers. In one embodiment, the computer system 1600 comprises a user interface 1605, a user input device 1610, a display 1615, a printer 1620, a processor 1625, a read only memory (ROM) 1630, the data storage device 50, such as a hard drive, a random access memory (RAM) 1635, and a storage media interface 1640, all of which are coupled to a bus 1645 or other communication means for communicating information. Although the computer system 1600 is represented herein as a standalone system, it is not limited to such, but instead can be part of a networked system. For example, the computer system 1600 may be connected locally or remotely to the storage device 50 that is fixed or removable and data transmission devices 1650. Further the computer system 1600, such as the server computer system 20 or the client computer system 15, also can be connected to other computer systems via the data transmission devices 1650. Elements 20 and 15 are described with reference to FIG. 1.

The RAM 1635, the data storage device 50 and the ROM 1630, are memory components 1655 that store data 60 and instructions for controlling the operation of processor 1625, which may be configured as a single processor or as a plurality of processors. The processor 1625 executes a program 1660 to perform the methods of system 10, as described herein. Element 60 is described with reference to FIG. 1.

While the program 1660 is indicated as loaded into the RAM 1635, it may be configured on a storage media 1665 for subsequent loading into the data storage device 50, the ROM 1630, or the RAM 1635 via an appropriate storage media interface 1640. Storage media 1665 can be any conventional storage media such as a magnetic tape, an optical storage media, a compact disk, or a floppy disk. Alternatively, storage media 1665 can be a random access memory 1635, or other type of electronic storage, located on a remote storage system.

Generally, the computer programs and operating systems are all tangibly embodied in a computer-usable medium, such as the memory 1655, the data storage device 50, or the data transmission devices 1650, thereby making an article of manufacture, such as a computer program product, according to the invention. As such, the terms "computer program product" as used herein are intended to encompass a computer program 1660 accessible from any computer-readable device or media.

Moreover, the computer programs 1660 and operating systems are comprised of instructions which, when read and executed by the computer system 1600, cause the computer system 1600 to perform the steps necessary to implement and use system 10. Under control of the operating system, the computer programs 1660 may be loaded from the memory 1655, the data storage device 50, or the data transmission devices 1650 into the memories 1655 of the computer system 1600 for use during actual operations. Those skilled in the art will recognize many modifications may be made to this configuration without departing from the scope of system 10.

The user interface 1605 is an input device, such as a keyboard or speech recognition subsystem, for enabling a user to communicate information and command selections to the processor 1625. The user can observe information generated by the computer system 1600 via the display 2165 or the printer 1620. The user input device 2X222 is a device such as a mouse, track-ball, or joy-stick, that allows the user to manipulate a cursor on the display 2165 for communicating additional information and command selections to the processor 1625.

When operating in accordance with one embodiment of system 10, the computer system 1600 determines an index performance indicator NeQr 208 to evaluate the grid index 204 performance, and comprises a technique for improving grid-indexing searches that use grid indexes 204 and operate on the multidimensional database 45. More particularly the computer system 1600 reduces the amount of data 60 that results from sampling during statistics collections that are used to determine an efficient grid cell size 224 so that the grid indexing that locates a particular minimum bounding rectangle 355 is sufficiently efficient. The processor 1625 and the program 1660 collectively operate as a module for improving grid-indexing searches that operate on the multidimensional database 45. It will be appreciated that system 10 offers many advantages over conventional techniques.

System 10 is typically implemented using one or more computer programs 1660, each of which executes under the control of an operating system and causes the computer system 1600 to perform the desired functions as described herein. Thus, using the present specification, the invention may be implemented as a machine, process, method, system, or article of manufacture by using standard programming and engineering techniques to produce software, firmware, hardware or any combination thereof.

It is to be understood that the specific embodiments of the invention that have been described are merely illustrative of certain applications of the principle of system 10. Numerous modifications may be made to the system and method for determining an optimal grid index specification for multidimensional data described herein without departing from the spirit and scope of system 10.

What is claimed is:

1. A method of determining an optimal grid index specification for multidimensional data, comprising:
creating a geometry histogram by scanning geometries to determine minimum and maximum extents, computing bucket sizes of buckets, and scanning the geometries to generate the geometry histogram using the buckets, wherein the bucket sizes are computed by dividing a size of a largest maximum bounding rectangle into a number of intervals;
computing a set of query region sizes;
for each size of a set of query region sizes, computing a minimum performance indicator by, for each of the buckets of the geometry histogram, estimating a number of index entries for each of multiple grid size levels by computing bucket intersections; and
returning an optimal grid size for each size of the query region.

2. The method of claim 1, further comprising:
computing a set of grid sizes at a first level of the multiple grid size levels.

3. The method of claim 2, wherein computing the minimum performance indicator further comprises:
computing a matrix of grid size levels for the first level;
for each matrix row of the matrix,
    computing the number of index entries; and
    in response to determining that the number of index entries is less than minimum number of index entries, setting the minimum number of index entries to the determined number of index entries.

4. The method of claim 3, wherein computing the number of index entries further comprises:
computing estimated intersections for each of multiple grid sizes.

* * * * *